United States Patent
Lindholm et al.

(10) Patent No.: US 8,886,183 B2
(45) Date of Patent: Nov. 11, 2014

(54) ATTACHING TO AN ACCESS NETWORK

(75) Inventors: Fredrik Lindholm, Stockholm (SE); Magnus Hallenstal, Taby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 258 days.

(21) Appl. No.: 13/508,517

(22) PCT Filed: Nov. 13, 2009

(86) PCT No.: PCT/EP2009/065109
§ 371 (c)(1),
(2), (4) Date: Jun. 20, 2012

(87) PCT Pub. No.: WO2011/057668
PCT Pub. Date: May 19, 2011

(65) Prior Publication Data
US 2012/0252445 A1    Oct. 4, 2012

(51) Int. Cl.
*H04W 4/00* (2009.01)
*H04W 8/26* (2009.01)
*H04W 8/06* (2009.01)

(52) U.S. Cl.
CPC .. *H04W 8/26* (2013.01); *H04W 8/06* (2013.01)
USPC .............. 455/433; 455/432.1; 455/435.1; 455/435.2; 455/435.3

(58) Field of Classification Search
USPC ............. 455/410, 411, 433, 432.1–432.3, 455/435.1–435.3
See application file for complete search history.

(56) References Cited

U.S. PATENT DOCUMENTS

| | | |
|---|---|---|
| 2002/0197991 A1 | 12/2002 | Anvekar et al. |
| 2008/0026740 A1 | 1/2008 | Netanel |
| 2011/0007726 A1 | 1/2011 | Xie et al. |

FOREIGN PATENT DOCUMENTS

| | | |
|---|---|---|
| CN | 1917712 A | 2/2007 |
| CN | 101278594 A | 10/2008 |
| CN | 101534498 A | 9/2009 |
| WO | WO 2007/044524 A2 | 4/2007 |

OTHER PUBLICATIONS

International Search Report, PCT Application No. PCT/EP2009/065109, Dec. 9 2010, 4 pages.
Written Opinion of the International Searching Authority, PCT Application No. PCT/EP2009/065109, Dec. 9, 2010, 9 pages.
International Preliminary Report on Patentability, PCT/EP2009/065109, Jan. 19, 2012, 8 pages.
A. Henry-Labordere: "Virtual Roaming Systems for GSM, GPRS and UMTS: Open Connectivity in Practice", Oct. 20, 2009, Wiley Online Library, XP002611737, ISBN: 9780470684283 pp. 1-49.

(Continued)

*Primary Examiner* — Wayne Cai
(74) *Attorney, Agent, or Firm* — Myers Bigel Sibley & Sajovec, P.A.

(57) ABSTRACT

A method and apparatus for allowing a terminal to attach to an access network. The terminal determines that the access network does not support a subscriber identifier used by the terminal, and so it attaches to the access network using an IMSI, the IMSI having been pre-provisioned at the terminal. The terminal, once attached, sends a request for a roaming IMSI to a remote node in the subscriber's home network. It then receives a roaming IMSI from the remote, the roaming IMSI being associated with the subscription and related subscriber identifier. The terminal detaches from the access network and then re-attaches to the access network using the roaming IMSI.

18 Claims, 4 Drawing Sheets

(56) References Cited

OTHER PUBLICATIONS

3GPP TS 24.008 V9.0.0 (Sep. 2009) $3^{rd}$ Generation Partnership Project; Technical Specification Group Core Network and Terminals; Mobile radio interface Layer 3 specification; Core network protocols; Stage 3 (Release 9); 650 Route des Lucioles, Sophia Antipolis, Valbonne, France; 591 pages.

3GPP TS 24.301 V9.0.0 (Sep. 2009) $3^{rd}$ Generation Partnership Project; Technical Specification Group Core Network and Terminals; Non-Access-Stratum (NAS) protocol for Evolved Packet System (EPS); Stage 3 (Release 9); 650 Route des Lucioles, Sophia Antipolis, Valbonne, France; 272 pages.

Search Report and First Office Action (English language translation), Chinese Patent Application No. 200980162422.6, May 22, 2014.

ATTACHING TO AN ACCESS NETWORK

CROSS REFERENCE TO RELATED APPLICATIONS

This application is a 35 U.S.C. §371 national stage application of PCT International Application No. PCT/EP2009/065109, filed on 13 Nov. 2009, the disclosure and content of which is incorporated by reference herein in its entirety. The above-referenced PCT International Application was published in the English language as International Publication No. WO 2011/057668 A1 on 19 May 2011.

TECHNICAL FIELD

The invention relates to the field of allowing a terminal to attach to an access network, and in particularly in the case where a subscriber identifier used by the terminal is not supported by the access network.

BACKGROUND

Communications devices, such as mobile telephones or personal computers, allow a subscriber to attach to a communication network and communicate with other devices.

Furthermore, a growth area is that of machine to machine (M2M) communication, in which communications are sent between different devices without human intervention. Examples of the use of M2M communication include sensor networks (for example, networks for monitoring weather conditions,), surveillance equipment (for example alarm systems, video monitoring, and so on), vehicle fleet management, vending machines, monitoring manufacturing and so on.

It is predicted that in the long term future, there will be billions of M2M devices, and the number of M2M devices will far exceed the number of devices used for communication between humans (such as mobile telephones, personal computers and so on).

When a device wishes to attach to an existing 3GPP mobile access network, it must register with the network and be authenticated. Registration and authentication are handled using information contained in a Subscriber Identity Module (SIM) or Universal Subscriber Identity Module (USIM) at the device. Each device is uniquely identified by an International Mobile Subscriber Identity (IMSI) that is stored at the SIM/USIM. The IMSI is a number range managed by ITU-T, where the number is split into three sections as follows:
1. Mobile Country Code (MCC) that uniquely identifies the country (three digits).
2. Mobile Network Code (MNC) that identifies the home Public Land Mobile Network (PLMN) of the mobile subscriber (two or three digits).
3. Mobile Subscriber Identification Number (MSIN) that identifies the mobile subscriber within a PLMN (nine to ten digits).

By way of example, if the MCC is 429, the MNC is 01, and the MSIN is 1234567890, then the IMSI is 429011234567890.

If the prediction of billions of devices holds, some countries will start to have a shortage of IMSI numbers, both for "human" subscribers and for M2M devices.

One approach to this problem is to associate a user subscription with a combination of both the IMSI and an International Mobile Equipment Identity (IMEI). The IMEI identifies the device used, and so this solution limits subscriptions to a particular device. For M2M devices, this is unlikely to be a problem.

There are various other techniques that may be used to effectively increase the number of IMSIs available. However, whichever technique is used, a problem may occur if a device moves out of its home network and attempts to attach to a visited network. If the visited network does not support a different format of subscription identifier (such as a combination of an IMSI and an IMEI, as described above) then the device will not be able to attach to the visited network.

SUMMARY

The inventors have recognized that the creation of new types of subscriber identifier in order to extend the number of subscriber identifiers that can be used will lead to problems when attaching to networks that do not support the new types of subscriber identifier, and it is an object of the invention to mitigate this problem.

According to a first aspect of the invention, there is provided a user terminal for use in a communications network. The user terminal is provisioned with a subscriber identifier, and has a determining function for determining that the subscriber identifier is not supported by an access network to which the terminal wishes to connect. The terminal is also provided with a memory at which at least one access International Mobile Subscriber Identity (IMSI) is stored. The access IMSI is specifically provisioned to allow the terminal to access a network that does not support the terminal's subscriber identifier. A transmitter is provided for sending a request to attach to the access network using the access IMSI. The transmitter, once the user terminal is attached to the access network using the access IMSI, sends a request to a remote node in the subscriber's home network, requesting a roaming IMSI. A receiver is provided for receiving from the remote node the roaming IMSI. The roaming IMSI is dynamically associated with the same subscription as the subscriber identifier, and so can be used by the terminal for the duration of the registration with the access network. The transmitter is also arranged to send a signal detaching the user terminal from the access network, and a further signal reattaching the user terminal to the access network using the roaming IMSI. In this way, a terminal that has an identifier that is not supported by the access network can still use the access network, and as new types of subscriber identifier are introduced, a terminal using a new type of access identifier will be able to access legacy access networks.

As an option, the user terminal is also provided with an attachment function for determining that the attachment using the access IMSI was unsuccessful, and a reattachment function for selecting a new access IMSI and waiting a predetermined period of time before attempting to re-attach to the access network using the new access IMSI. This is to ensure that if there is a collision of access IMSIs, in other words two terminals simultaneously try to use the same access IMSI with the same access network, a further attempt will be made to attach to the access network using a different access IMSI. Of course, it may be sufficient to attempt to re-attach to the access network using the same access IMSI but after waiting for a predetermined time period, as another user who was using the same access IMSI may now be provided with a roaming IMSI and have detached, thereby freeing the access IMSI for use.

The receiver is optionally arranged to receive from the access network either message(s) informing the user terminal that the access network does not support the subscriber identifier, or an error message sent by the access network in response to a request to attach to the access network using the subscriber identifier. Either of these will inform the determining function at the terminal that the access network does not support the subscriber identifier.

As an option, the receiver is arranged to, prior to receiving the roaming International Mobile Subscriber Identity, receive an authentication challenge from the node in the subscriber's home network, and the transmitter is arranged to send an authentication response to the node in the subscriber's home network. This allows the user terminal to be authenticated with the node that provisions the roaming IMSI.

According to a second aspect of the invention, there is provided a provisioning server for use in a communications network. The provisioning server comprises a first memory portion storing a plurality of roaming IMSIs, and a second memory portion storing a plurality of user subscriptions, each user subscription being associated with a subscriber identifier. A receiver is provided for receiving from a request for a roaming IMSI, the request including a subscriber identifier that is not supported by the access network. A selecting function selects a roaming IMSI that is not associated with another subscriber identifier (to ensure that the dynamically allocated roaming IMSIs are only mapped to one subscriber at any one time). A mapping function is provided for mapping the roaming IMSI to the subscription associated with the subscriber identifier, and a transmitter is provided for sending the selected roaming IMSI to the user terminal.

The provisioning server is optionally provided with a demapping function for, in the event that the user terminal detaches from the access network, removing the mapping between the roaming IMSI and the subscription associated with the subscriber identifier. This allows the roaming IMSI to be re-used by another subscriber at a later time.

Examples of subscriber identifiers that are not supported by access networks include any of a Long IMSI, an IMSI associated with a geographical location different to a current location of the terminal, an extended IMSI, and a combination of an IMSI with an International Mobile Equipment Identity.

The provisioning server is optionally a Home Subscriber Server or Home Location Register.

As an option, prior to sending the selected roaming International Mobile Subscriber Identity to the user terminal, the transmitter is arranged to send an authentication challenge to the user terminal, and the receiver is arranged to receive an authentication response from the terminal.

According to a third aspect of the invention, there is provided a method of allowing a terminal to attach to an access network. The terminal determines that the access network does not support a subscriber identifier used by the terminal, and so it attaches to the access network using an IMSI, the IMSI having been pre-provisioned at the terminal. The terminal, once attached, sends a request for a roaming IMSI to a remote node in the subscriber's home network. It then receives, from the remote node, a roaming IMSI. The roaming IMSI is associated with the subscription and related subscriber identifier. The terminal detaches from the access network and then reattaches to the access network using the roaming IMSI.

Examples of unsupported subscriber identifiers include a Long IMSI, an extended IMSI, an IMSI associated with a geographical location different to a current location of the terminal, and a combination of an IMSI with an International Mobile Equipment Identity, although it will be apparent that the invention applies to any type of subscriber identifier that is not supported by an access network.

As an option, the terminal determines that the communications network does not support its subscriber identifier either by receiving a message from the access network informing the terminal that the access network does not support the subscriber identifier, or by receiving an error message from the access network in response to a request to attach to the access network using the subscriber identifier.

In order to mitigate any problems that would otherwise be cause by a collision of IMSIs in the event that two terminals simultaneously attempt to attach to the access network using the same access IMSI, the user terminal optionally determines that the registration with the access network using the access IMSI has been unsuccessful, waits for a predetermined period of time and either selects a different access IMSI or re-uses the same access IMSI. The terminal then attempts to register with the access network using the access IMSI. The different access IMSI is optionally selected at random using a random or pseudorandom process.

The roaming IMSI is optionally received using one of packet switched service or a Short Message Service message.

The roaming IMSI is optionally associated with a geographical location and only valid when used in the geographical location. In this way, by restricting roaming IMSIs to certain locations such as countries, or other geographical locations, the pool of available IMSIs can be extended by re-using them in different geographical locations.

According to a third aspect of the invention, there is provided a computer program comprising computer readable code which, when run on a user terminal, causes the user terminal to behave as a user terminal as described above in the first aspect of the invention According to a fourth aspect of the invention, there is provided a computer program comprising computer readable code which, when run on a provisioning server, causes the provisioning server to behave as a provisioning server as described above in the second aspect of the invention.

According to a fifth aspect of the invention, there is provided a computer program product comprising a computer readable and a computer program as described above in the third and fourth aspects of the invention, wherein the computer program is stored on the computer readable medium.

DETAILED DESCRIPTION

Figure 1:
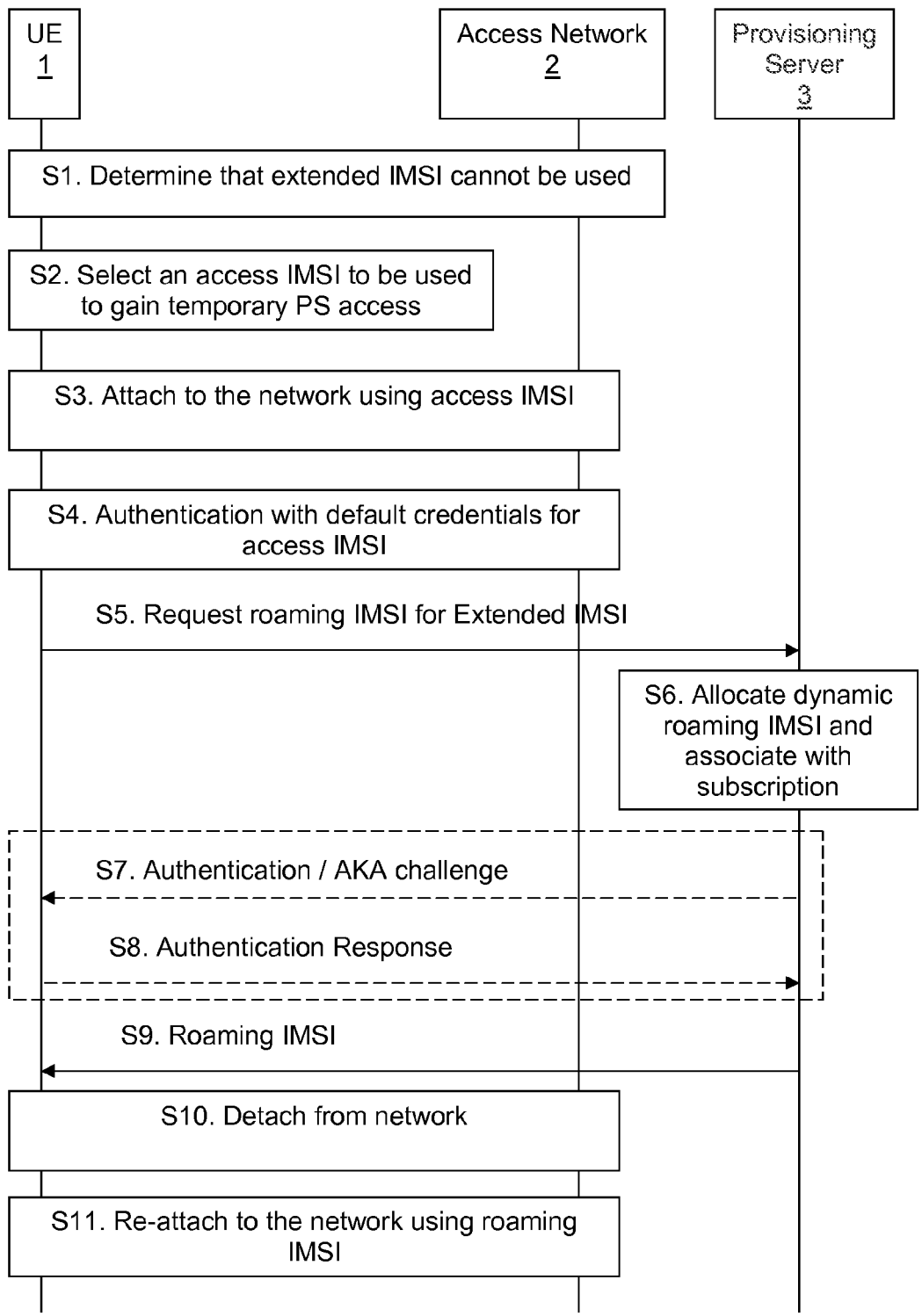
FIG. 1 is a signalling diagram showing an attachment procedure in accordance with an embodiment of the invention.

In order to solve the problem of limited numbers of available IMSIs, there are several possible solutions. One example, as described above, is to associate a combination of an IMSI and an IMEI with a subscription.

Another option is to use a "long IMSI". A long IMSI is an IMSI with more numbers available to identify the subscription. When a user terminal attaches to the network the network sends an Identity Request message to the user terminal asking for the long IMSI. The user terminal replies in an Identity Response message including with the long IMSI, which is identified in an identity type information element. Currently, the Mobile Identity information element specified by 3GPP TS 24.008 has the identity type specified in octet 3 of the information element, in which 001 is the IMSI, 010 is the IMEI, and 001 is no identity. Other identity types are ascribed to 011, 100, and 101. It is proposed that 110 is used for the Long IMSI. An example octet 3 is shown below in Table 1.

TABLE 1

Type of identity (octet 3)

| Bits | | | |
|---|---|---|---|
| 3 | 2 | 1 | |
| 0 | 0 | 1 | IMSI |
| 0 | 1 | 0 | IMEI |
| 0 | 1 | 1 | IMEISV |
| 1 | 0 | 0 | TMSI/P-TMSI/M-TMSI |
| 1 | 0 | 1 | TMGI and optional MBMS Session Identity |
| 0 | 0 | 0 | No Identity |
| 1 | 1 | 0 | Long IMSI |

According to the long IMSI embodiment, only the length of the mobile identity has changed. The long IMSI may be binary-coded decimal (BCD) coded in the same way as a standard IMSI, and the first half of the long IMSI 16 digits may also be coded in the same way as a standard IMSI. The long IMSI can be thought of as a standard IMSI with 16 additional digits.

Another option to solve the problem of limited numbers of available IMSIs is to add an extension to the mobile identity, as an optional information element within an Identity Response message. When the user terminal attaches to the network the network sends message Identity Request to the user terminal asking for the IMSI. In this embodiment there are 2 alternatives; the network requests an IMSI with an extension, or the network only requests the IMSI.

If the network requests an IMSI with an extension then the identity type information element is enhanced with a new identity type, IMSI—extended. In this embodiment, 110 in octet 3 of the information element is used for IMSI—extended. If the IMSI is not extended, then the user terminal responds with the IMSI only, but if the IMSI is extended then the user terminal sends an Identity Response message enhanced with an IMSI—extended. The IMSI—extended may, for example, be a 64 bit binary value. The extension need only be added if it has previously been requested by the network for. If the network only requested the IMSI, the extension may be sent depending on the network capabilities. For example, if the user terminal knows that the network supports the extension, and the SIM is provisioned with the extension, the extension is added to the Identity Response message when the IMSI is requested.

There are several ways in which the user terminal may determine whether the network supports the extension. For example, the extension support capability may be sent in a network broadcast, or the user terminal may try using the extension each time it attaches; if network rejects the message, the user terminal will know that the network does not support the extension. The extension may also be used for other types of mobile identities, such as IMEI for example.

Another option to solve the problem of limited numbers of available IMSIs is to add an extra identity type to the mobile identity information element. When the user terminal attaches to the network, the network sends an Identity Request message to the user terminal requesting the IMSI. Once the IMSI has been received, the network sends a new Identity request asking for an IMSI extension. In this embodiment, 110 in octet 3 of the information element is used for the IMSI extension. The user terminal responds with the IMSI extension within the mobile identity information element, in an Identity Response message.

Regardless of whether subscription is associated with a subscriber identifier such as a long IMSI, a combination of an IMSI and an IMEI, or one of the extended IMSI embodiments, a problem will arise if the user terminal attempts to attach to a network that does not support the new type of subscriber identifier. This may happen if the user terminal attempt to attach to a visited network that does not support the new type of subscriber identifier. It is also possible that the user terminal will not be able to attach to the home network using a new type of subscriber identifier. For example, the home network operator may use several different radio accesses types (LTE, 2G, 3G). The operator may choose to only upgrade newer radio access types to support the new type of subscriber identifier, or access type in the areas where most user terminals attach to the network. In this case, for those radio accesses types or areas where the new subscriber identifier is not supported, the terminal will not be able to attach even in the home network. In the following description, the example of the user terminal attaching to a visited network is used, but the skilled person will appreciate that the same principles apply equally to a user terminal attaching to its home network where the new type of subscriber identifier is not supported.

Figure 2:
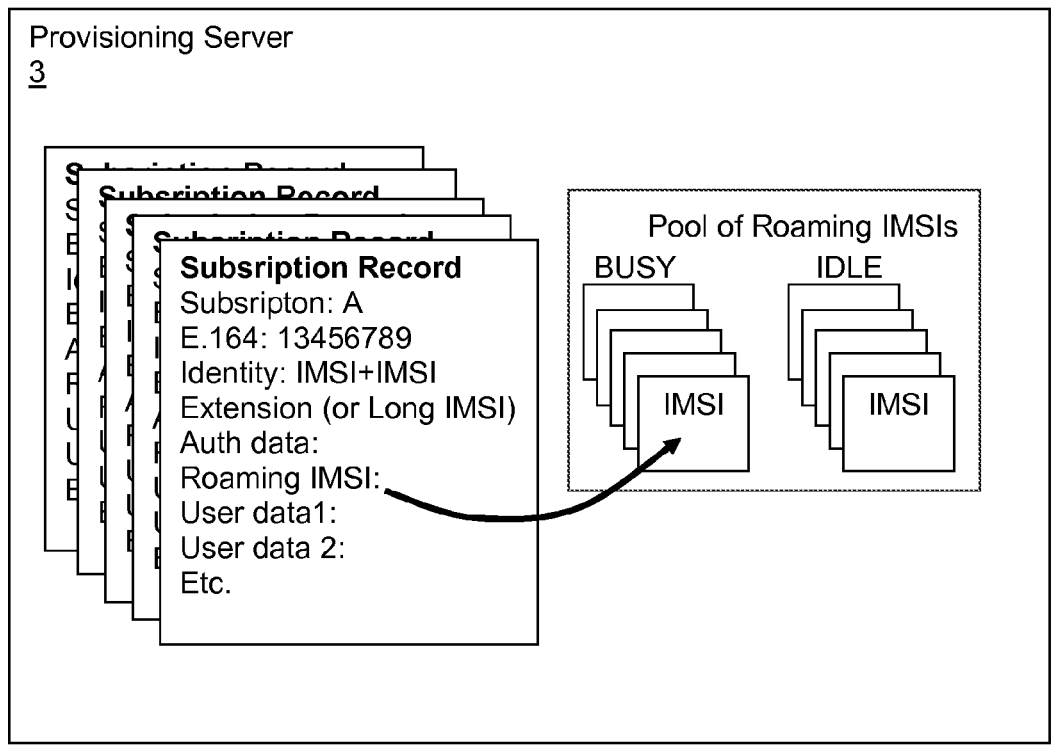
FIG. 2 illustrates schematically in a block diagram an allocation of subscriber identifiers in a provisioning server.

Referring to FIG. 1, a user terminal 1 attempts to attach to an access network 2. The following numbering refers to the numbering of FIG. 2:

S1. When a user terminal 1 that uses a new type of subscriber identifier attempts to attach to the access network 2, it must first determine whether the access network 2 supports the new type of subscriber identifier. The following three examples illustrate possible ways in which the user terminal 1 can determine whether or not the access network 2 supports the new type of subscriber identifier:

In a network broadcast of System Information on the radio interface, a parameter is included that informs all user terminals whether or not the access network 2 supports the new type of identifier.

The access network may specifically request the new type of subscriber identifier (a long IMSI, an extended IMSI, a combination of the IMSI and IMEI etc.)

Where an extended IMSI is used, the user terminal 1 tries to use the extension. If the access network 2 does not support the extension, the access network 2 will inform the user terminal 2 that the message was erroneous. The user terminal therefore knows that the access network 2 does not support the new type of subscriber identifier.

If the access network 2 supports the new type of subscriber identifier, then the new type of subscriber identifier is used when interacting with the home network, and normal operation as in home network applies. If the access network 2 does not support the new type of subscriber identifier, then the user terminal 1 must attach to the access network 2 using a different subscriber identifier that the access network 2 does support (see S2).

S2. If the access network 2 does not support the new type of subscriber identifier, it will only be possible for the user terminal 1 to use a standard IMSI as the subscriber identification towards the home network. The user terminal 1 (or its SIM card) is pre-provisioned with one or more standard IMSIs that are to be used only for the purposes of attaching to the access network 2. Such an IMSI is termed herein an "access IMSI".

S3. The user terminal 1 attaches to the access network using the access IMSI. The access IMSI used to gain temporary and limited access may be related to the extended IMSI, or a randomly selected IMSI from a range of IMSIs that has been configured in the SIM or user terminal 1 by the network operator to be used for temporary access. Using an access IMSI from a range of access IMSI reduces the likelihood of collisions when attaching (in other words, it reduces the risks that more than one user terminal attempts to use the same access IMSI at the same time). The access IMSI may only permit limited access to the access network 2, for example it may only allow the user terminal 1 to connect to a particular access point name (APN), or only allow Short Message Service (SMS) signalling etc.

S4. When attaching to get limited and temporary access, the user terminal 1 may also need to be authenticated. The access IMSI used can be shared between all/many user terminals for the operator, and so the credentials used must be a pre-configured standard credential that can be used by any of the user terminals.

S5. Once the user terminal 1 acquires limited network access, it sends a request for a roaming IMSI to a provisioning server 3. A roaming IMSI is a dynamically allocated IMSI that the provisioning server 3 provides to the user terminal 1 for the duration of the registration. The roaming IMSI is associated with the user subscription associated with the new type of subscriber identifier. This process may be over an IP connection to a server in the user's home network. The user terminal 1 provides the new type of subscriber identifier (e.g. the IMSI and the IMSI extension, the long IMSI or the IMSI/IMEI combination) in the request. An alternative to using an IP access would be to use SMS. This may be required in the event that the access network 2 does not have PS access available. In this case, the user terminal 1 attaches to the access network 2 in similar way to obtain temporary access. Once it has obtained access, it sends a SMS message to a pre-configured number requesting a roaming IMSI associated with its own subscriber identifier. The response (see step S9) including the Roaming IMSI is provided over SMS as well in this instance.

S6. Once the provisioning server 3 receives the request for a roaming IMSI, it allocates a roaming IMSI to the user terminal 1 and associates the allocated roaming IMSI with the subscription. The provisioning server 3 may be a Home Subscriber Server (HSS) or Home Location Register (HLR) or connected to the HSS or HLR. It maintains pool of roaming IMSIs used for potential roaming users. It also allocates the roaming IMSI and keeps track of available roaming IMSIs, as well as linking allocated roaming IMSIs to associated subscriber profiles. At this stage, the Roaming IMSI is now linked to the subscriber record also containing the original IMSI and IMSI extension in HSS (see FIG. 2, in which the allocated roaming IMSI is linked to the subscription).

S7. In an optional embodiment, the provisioning server 3 sends an Authentication/Authentication and Key Agreement (AKA) challenge to the user terminal 1 based on the subscription credentials. Note that the user terminal 1 will be authenticated at a later stage in any case, but it may be desirable to perform this authentication at this stage to mitigate potential Denial of Service (DoS) attacks.

S8. The user terminal 1 sends an Authentication response to the provisioning server 3.

S9. Once the roaming IMSI is allocated, the provisioning server 3 sends it to the user terminal 1.

S10. Once the user terminal 1 has received the roaming IMSI, it detaches from the access network 2.

S11. The user terminal 1 is no longer attached to the access network using the access IMSI. The user terminal 1 then re-attaches to the access network using the dynamically allocated roaming IMSI.

It will be appreciated that when the user terminal 1 detaches from the access network using the roaming IMSI, the provisioning server 3 will be informed of this so that it can release the mapping between the roaming IMSI and the user subscription. This allow the roaming IMSI to be reused for another user.

To further extend the roaming IMSI pool used by the provisioning server 3, each roaming IMSI may only be valid in a certain visited country. When the user terminal 1 passes a country border it will perform a Location Area Update (LAU)/Routing Area Update (RAU)/Tracking Area Update (TAU). The authentication will fail, as the roaming IMSI for this country is not associated with the user's credentials, and so the user terminal 1 will need to obtain a new roaming IMSI.

When the user terminal 1 roams into a network supporting the new type of subscriber identifier (or new country if country-specific roaming IMSIs are used), or after a certain time interval after the user terminal 1 has detached from the access network 2, the roaming IMSI is released and made available from the pool to be used by other roaming user terminals.

It will be appreciated that if a user terminal 1 (or its SIM) is provisioned with several access IMSIs, there is a possibility that two terminals associated with the same operator could try to obtain temporary access at the same time and using the same access IMSI. If this should occur, then it is possible that either the user terminal 1 attachment procedure using the access IMSI will fail, or the user terminal 1 is provided with a roaming IMSI that was intended for a different user terminal. In this case, attachment with the roaming IMSI will fail in any case. The user terminal will not be able to authenticate itself with the roaming IMSI, as the roaming IMSI is dynamically allocated to a user subscription that is not associated with the user terminal. Therefore a collision of user terminals using the same access IMSI will lead to a failure to attach to the network.

Figure 3:
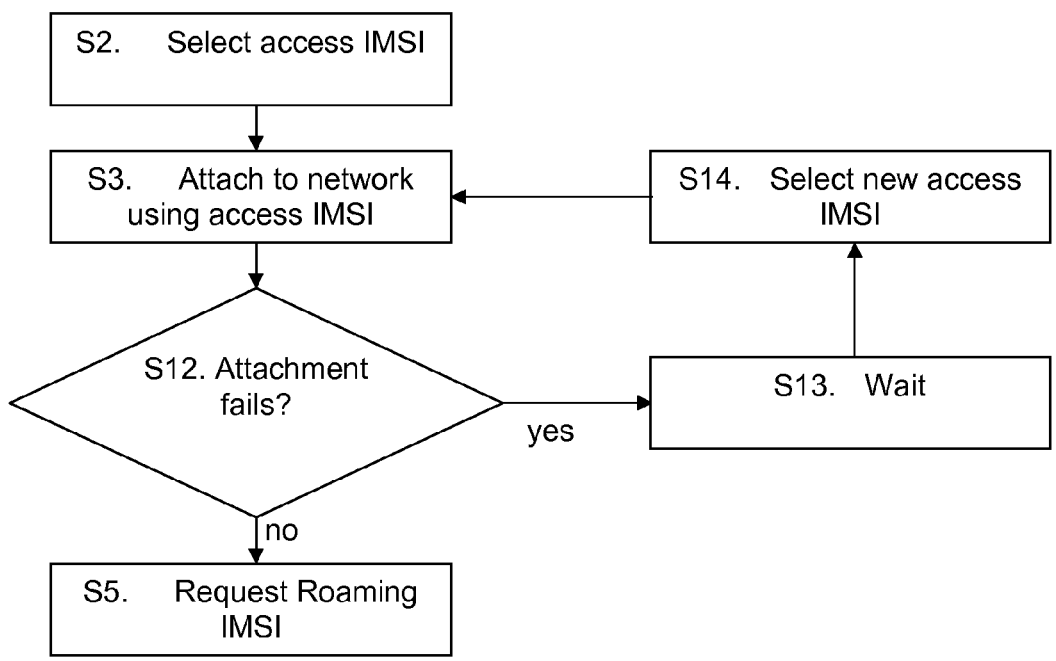
FIG. 3 is a flow diagram illustrating the attachment procedure in the event that attachment fails.

FIG. 3 shows the steps taken in order to mitigate the problems associated with collision, with the following numbering corresponding to the numbering of the Figure:

S2. The user terminal selects an access IMSI.

S3. The user terminal attempts to attach to the access network 2 using the access IMSI.

S12. If the attempt to attach to the access network 2 succeeds then the process continues at step S5, as described above. If, on the other hand, the attempt fails then the process continues at step S13.

S13. The user terminal 1 waits for a predetermined length of time.

S14. The user terminal 1 selects a new access IMSI to try. It is preferable if the user terminal 1 selects the new access IMSI at random. Of course, steps S13 and S14 may be performed in the opposite order. The process then returns to step S3.

Figure 4:
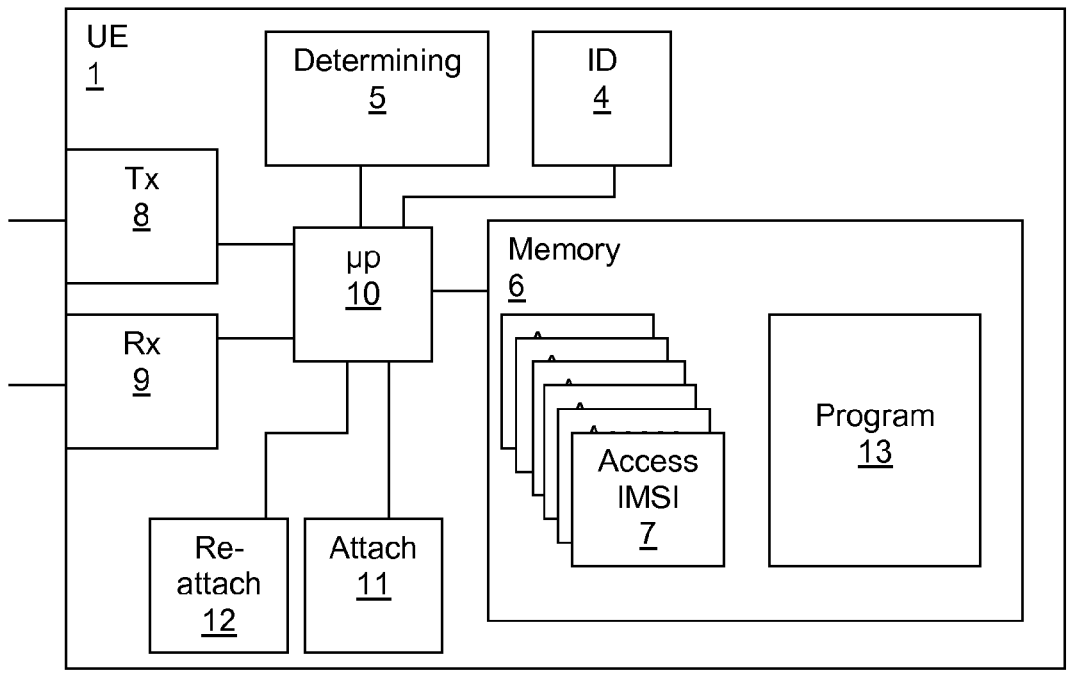
FIG. 4 is a signalling diagram showing an attachment procedure in accordance with a further embodiment of the invention.

FIG. 4 illustrates a user terminal 1 according to an embodiment of the invention. The user terminal is provided with a new type of subscriber identifier 4 such as a long IMSI, an extended IMSI, or an IMSI/IMEI combination. This may be stored in a memory or a *SIM. A determining function 5 is provided for ascertaining whether the access network 2 supports the subscriber identifier 4. A memory 6 stores at least one access IMSI 7, the access IMSI 7 being of a type supported by the access network 2.

A transmitter 8 is provided for sending a request to attach to the access network 2 using the selected access IMSI 7. A receiver 9 is provided for receiving a roaming IMSI from the provisioning server 3. The transmitter 8 is also arranged to send a signal detaching the user terminal 1 from the access network 2, and a further signal reattaching the user terminal 1 to the access network 2 using the roaming IMSI. A processor 10 is provided for controlling the user terminal and the operations described above. It will be appreciated that the description of the transmitter 8 and receiver 9 is function only; they may be physically embodied using any suitable structure, such as a single transceiver, or one or more transmitters and receivers.

The user terminal 1 may also be provided with an attachment function 11 for determining that the attachment using the access IMSI was unsuccessful, and a re-attachment function 12 for selecting a new access IMS from the memory 6 and waiting a predetermined period of time before attempting to re-attach to the access network using the new access identifier.

Where many of the functions described above are implemented using software, the memory 6 is a computer readable medium on which a computer program 13 for controlling the operation of the processor 10 is stored.

Figure 5:
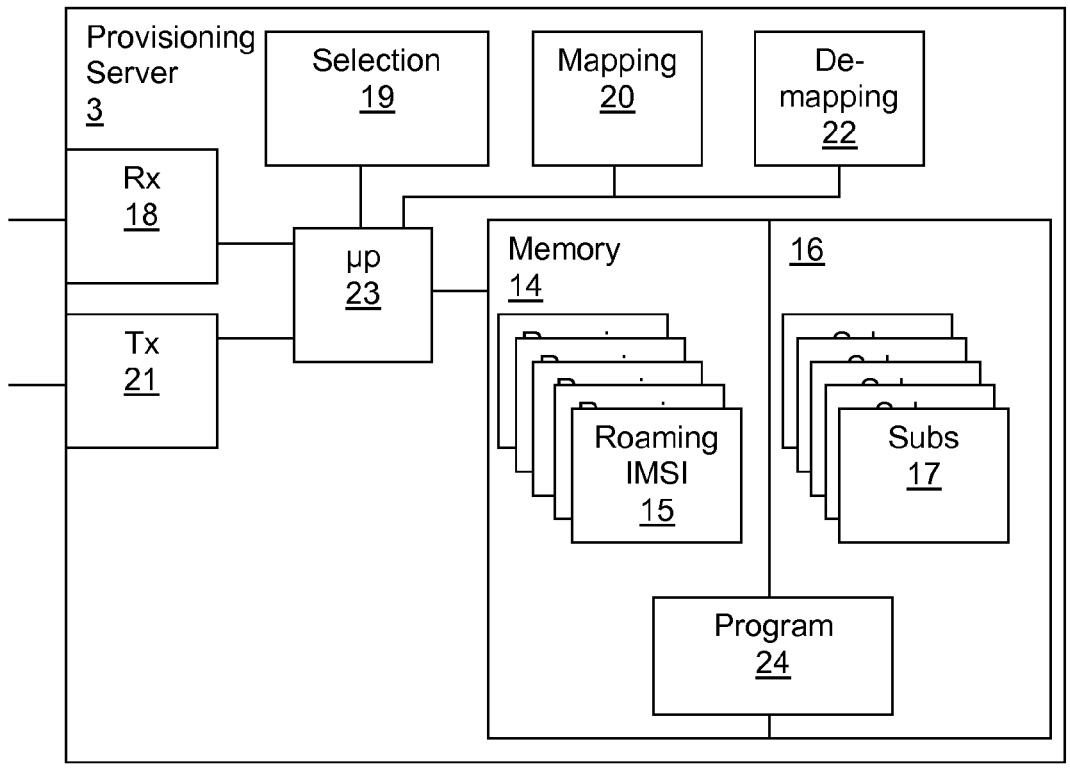
FIG. 5 illustrates a block diagram of a provisioning server configured according to an embodiment.

Turning now to FIG. 5, there is illustrated a provisioning server 3 such as an HSS or HLR. The provisioning server 3 has a first memory portion 14 storing a plurality of roaming identifiers 15. A second memory portion 16 is provided for storing a plurality of user subscriptions 17, each user subscription being associated with a new type of identifier that is not supported by the access network 2. Of course, the two memory portions may be a part of the same physical memory.

A receiver 18 is provided for receiving from a request for a roaming IMSI from the user terminal 1. A selection function 19 is provided for selecting a roaming IMSI 15 that is not associated with any other subscription, and a mapping function 20 is provided for mapping the roaming IMSI 15 to the subscription associated 17 with the new type of identifier. A transmitter 21 is provided for sending the selected roaming IMSI to the user terminal 1. A demapping function 22 is also provided. When the user terminal 1 detaches from the access network 2, the demapping function 22 removes the mapping between the roaming IMSI 15 and the subscription 17 associated with the new type of identifier. A processor 23 may also be provided for controlling the processes of the provisioning server.

Many of the functions described above may be implemented using software, in which case the memory 14, 15 is a computer readable medium on which a computer program 24 for controlling the operation of the processor 23 is stored.

Figure 6:
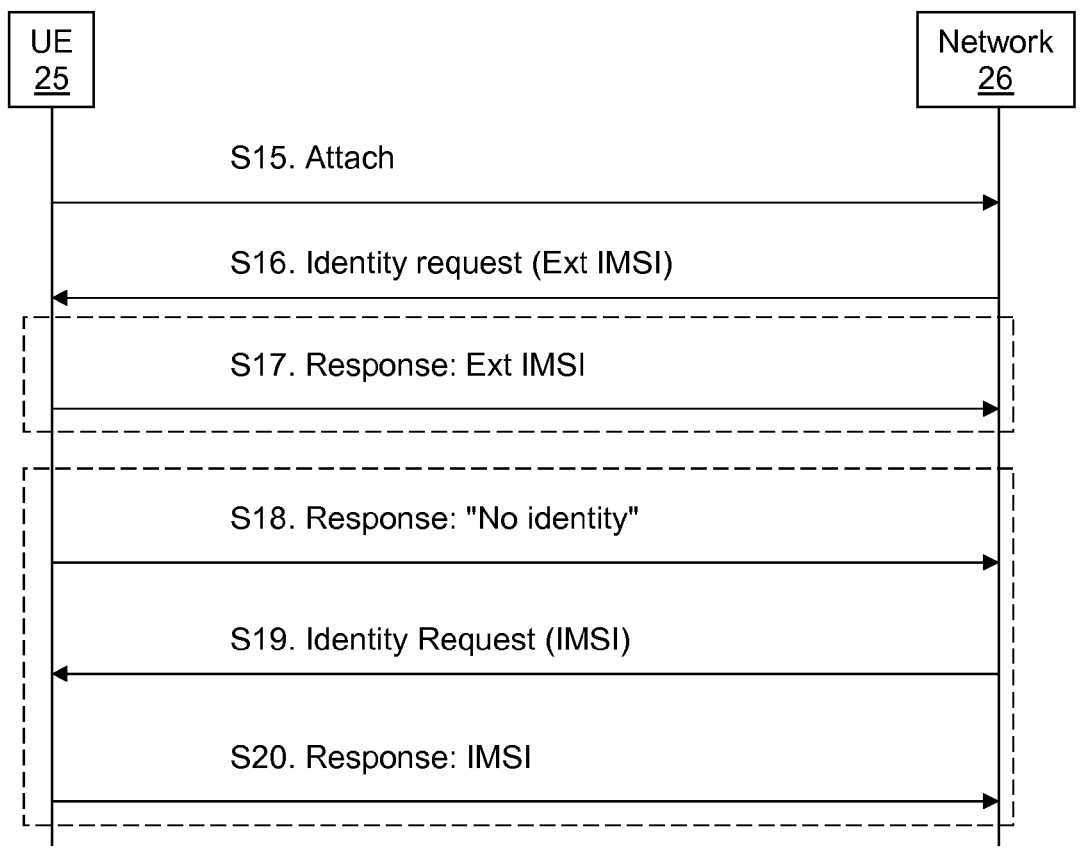
FIG. 6 is a flow diagram illustrating operations performed when a user terminal roams into an access network that does not support new types of subscriber identity in accordance with an embodiment.

Referring now to FIG. 6, it may be that a legacy user terminal 4 does not support new types of subscriber identifiers and is only provided with a standard IMSI. If the legacy user terminal 25 roams into an access network 26 that does support new types of subscriber identifier, then the access network 25 should still allow this. The following numbering corresponds to the numbering of FIG. 6:

S12. The legacy user terminal 25 sends an attachment request to the access network 5.

S13. The access network 26 responds requesting the identity, and also requesting, in the case where an extended IMSI is used, the extended IMSI S14. If the legacy user terminal 25 has been provided with an extended IMSI, then it responds to the request and attachment proceeds as normal.

S15. If the legacy user terminal 25 has not been provided with an extended IMSI, or does not support extended IMSIs, then it responds "No Identity" to the request.

S16. The access network 26 reissues the Identity request, this time requesting only the IMSI.

S17. The legacy user terminal 25 responds to the second Identity request with its IMSI.

The invention allows terminals that use new types of identifier, such as a long IMSI, an extended IMSI or an IMSI/IMEI combination, to attach to legacy networks that do not support new types of IMSI or identifier. It will be appreciated by the person of skill in the art that various modifications may be made to the above-described embodiments without departing from the scope of the invention as defined in the appended claims. For example, whilst the above description refers to IMSIs, it will be appreciated that the invention could be adapted to work with any type of subscriber identifier that is not supported by the access network.

The following acronyms have been used in this description:
3GPP Third Generation Partnership Project
AKA Authentication and Key Agreement
APN Access Point Name
AS Application Server
BCD Binary-coded decimal
DoS Denial of Service
HLR Home Location Register
HSS Home Subscriber Server
IMEI International Mobile Equipment Identity
IMS IP Multimedia Subsystem
IMSI International Mobile Subscriber Identity
LAU Location Area Update
LTE Long Term Evolution
M2M Machine to machine
MCC Mobile Country Code
MNC Mobile Network Code
MSIN Mobile Subscriber Identification Number
PLMN Public Land Mobile Network
RAU Routing Area Update
SDP Session Description Protocol
SIM Subscriber Identity Module
SIP Session Initiation Protocol
SMS Short Message Service
TAU Tracking Area Update
USIM Universal Subscriber Identity Module

The invention claimed is:

1. A user terminal for use in a communications network, the user terminal being provisioned with a subscriber identifier and comprising:
a determining function circuit configured to determine that the subscriber identifier is not supported by an access network;
a memory storing at least one access International Mobile Subscriber Identity;
a transmitter for sending a request to attach to the access network using the access International Mobile Subscriber Identity;
the transmitter being further arranged to, once the user terminal is attached to the access network, send to a remote node in the subscriber's home network a request for a roaming International Mobile Subscriber Identity;

a receiver for receiving from the remote node the roaming International Mobile Subscriber Identity, the roaming International Mobile Subscriber Identity being dynamically associated with the same subscription as the subscriber identifier;

the transmitter being further arranged to send a signal detaching the user terminal from the access network, and a further signal reattaching the user terminal to the access network using the roaming International Mobile Subscriber Identity.

2. The user terminal according to claim 1, further comprising:

an attachment function circuit configured to determine that the attachment using the access International Mobile Subscriber Identity was unsuccessful;

a re-attachment function circuit configured to wait for a predetermined period of time before attempting to re-attach to the access network using one of the access International Mobile Subscriber Identity and a selected different access International Mobile Subscriber Identity.

3. The user terminal according to claim 1, wherein the receiver is arranged to receive from the access network one of a message informing the user terminal that the access network does not support the subscriber identifier, and an error message sent by the access network in response to a request to attach to the access network using the subscriber identifier.

4. The user terminal according to claim 1, wherein the receiver is arranged to, prior to receiving the roaming International Mobile Subscriber Identity, receive from the node in the subscriber's home network an authentication challenge, and the transmitter is arranged to send to the node in the subscriber's home network an authentication response.

5. A provisioning server for use in a communications network, the provisioning server comprising:

a first memory portion storing a plurality of roaming International Mobile Subscriber Identities;

a second memory portion storing a plurality of user subscriptions, each user subscription being associated with a subscriber identifier;

a receiver for receiving from a user terminal a request for a roaming International Mobile Subscriber Identity, the request including a subscriber identifier that is not supported by an access network;

a selecting function circuit configured to select a roaming International Mobile Subscriber Identity that is not associated with another subscriber identifier;

a mapping function circuit configured to map the roaming International Mobile Subscriber Identity to the subscription associated with the subscriber identifier;

a transmitter for sending the selected roaming International Mobile Subscriber Identity to the user terminal.

6. The provisioning server according to claim 5, further comprising a demapping function circuit configured to respond to the user terminal detaching from the access network, by removing the mapping between the roaming International Mobile Subscriber Identity and the subscription associated with the subscriber identifier.

7. The provisioning server according to claim 5, wherein the subscriber identifier is selected from any of a Long International Mobile Subscriber Identity, an International Mobile Subscriber Identity associated with a location different to a current location of the terminal, an extended International Mobile Subscriber Identity, and a combination of an International Mobile Subscriber Identity with an International Mobile Equipment Identity.

8. The provisioning server according to claim 5, wherein the provisioning server is one of a Home Subscriber Server and a Home Location Register.

9. The provisioning sever according to claim 5, wherein the transmitter is arranged to, prior to sending the selected roaming International Mobile Subscriber Identity to the user terminal, send to the user terminal an authentication challenge, and the receiver is arranged to receive from the terminal an authentication response.

10. A method of allowing a terminal to attach to an access network, the method comprising:

at the terminal, determining that the access network does not support a subscriber identifier used by the terminal;

attaching to the access network using an International Mobile Subscriber Identity, the International Mobile Subscriber Identity having been pre-provisioned at the terminal;

sending to a remote node in the subscriber's home network a request for a roaming International Mobile Subscriber Identity;

receiving from the remote a roaming International Mobile Subscriber Identity, the roaming International Mobile Subscriber Identity being associated with the subscription and related subscriber identifier;

detaching from the access network; and re-attaching to the access network using the roaming International Mobile Subscriber Identity.

11. The method according to claim 10 wherein the subscriber identifier is selected from any of a Long International Mobile Subscriber Identity, an extended International Mobile Subscriber Identity, an International Mobile Subscriber Identity associated with a location different to a current location of the terminal, and a combination of an International Mobile Subscriber Identity with an International Mobile Equipment Identity.

12. The method according to claim 10, wherein the step of determining that the communications network does not support a subscriber identifier used by the terminal is selected from any of:

receiving a message from the access network, the message informing the user terminal that the access network does not support the subscriber identifier; and receiving an error message from the access network in response to a request to attach to the access network using the subscriber identifier.

13. The method according to claim 10, further comprising:

at the user terminal, determining that the registration with the access network using the access International Mobile Subscriber Identity has been unsuccessful;

waiting for a predetermined period of time; and attempting to register with the access network using the one of access International Mobile Subscriber Identity and a selected different access International Mobile Subscriber Identity.

14. The method according to claim 13, wherein the different International Mobile Subscriber Identity is selected at random from a set of International Mobile Subscriber Identities.

15. The method according to claim 10, wherein the roaming International Mobile Subscriber Identity is received using one of packet switched service or a Short Message Service message.

16. The method according to claim 10, wherein the roaming International Mobile Subscriber Identity is associated with a geographical location and only valid when used in the geographical location.

17. A computer program product comprising a non-transitory medium containing computer readable code which when run on a processor of the user terminal causes the processor to perform the method according to claim 1.

18. A computer program product comprising a non-transitory medium containing computer readable code which when run on a processor of the provisioning server causes the processor to perform the method according to claim 5.

\* \* \* \* \*

UNITED STATES PATENT AND TRADEMARK OFFICE
CERTIFICATE OF CORRECTION

PATENT NO. : 8,886,183 B2  
APPLICATION NO. : 13/508517  
DATED : November 11, 2014  
INVENTOR(S) : Lindholm et al.

Page 1 of 1

It is certified that error appears in the above-identified patent and that said Letters Patent is hereby corrected as shown below:

In the specification

In Column 9, Line 63, delete "network 25" and insert -- network 26 --, therefor.

In the claims

In Column 12, Line 4, in Claim 9, delete "sever" and insert -- server --, therefor.

Signed and Sealed this
Sixth Day of October, 2015

Michelle K. Lee
*Director of the United States Patent and Trademark Office*